United States Patent [19]

Ide et al.

[11] 3,925,510
[45] Dec. 9, 1975

[54] VINYL CHLORIDE POLYMER COMPOSITION

[75] Inventors: Fumio Ide; Kazuo Kishida; Akira Hasegawa, all of Otake, Japan

[73] Assignee: Mitsubishi Rayon Co., Ltd., Tokyo, Japan

[22] Filed: Mar. 21, 1974

[21] Appl. No.: 453,543

[30] Foreign Application Priority Data

Mar. 26, 1973 Japan............................... 48-33465
Apr. 19, 1973 Japan............................... 48-44328
May 28, 1973 Japan............................... 48-59568

[52] U.S. Cl.... 260/876 R; 260/31.2 R; 260/31.2 N; 260/45.75 K; 260/881; 260/884; 260/885
[51] Int. Cl.$^2$ ............... C08L 51/04; C08L 27/06; C08L 31/02
[58] Field of Search ............................... 260/876 R

[56] References Cited
UNITED STATES PATENTS

| | | | |
|---|---|---|---|
| 3,426,101 | 2/1969 | Ryan ............................... | 260/876 R |
| 3,655,826 | 4/1972 | Fellmann et al. ............... | 260/876 R |
| 3,678,133 | 7/1972 | Ryan ............................... | 260/876 R |
| 3,787,522 | 1/1974 | Dickie et al. ....................... | 260/836 |
| 3,793,402 | 2/1974 | Owens............................ | 260/876 R |

Primary Examiner—Murray Tillman
Assistant Examiner—Thurman K. Page
Attorney, Agent, or Firm—Armstrong, Nikaido & Wegner

[57] ABSTRACT

A thermoplastic vinyl chloride polymer composition superior in processing properties is provided. The composition comprises (I) polyvinyl chloride or a copolymer predominantly comprised of vinyl chloride and (II) a methyl methacrylate composite polymer characterized by the combination of 10 to 60% of component A consisting essentially of, in polymerized form, 80 to 100% of methyl methacrylate, 0 to 20% of a copolymerizable monoethylenically unsaturated monomer and 0 to 2% of a copolymerizable polyfunctional monomer having at least two ethylenically unsaturated bonds, and having a reduced viscosity of at least 2.0;

40 to 80% of component B consisting essentially of in polymerized form, 30 to 80% of styrene or substituted styrene and 70 to 20% of an acrylic or methacrylic acid ester, and having a reduced viscosity of not greater than 1.0; and 0 to 40% of component C consisting essentially of in polymerized form, 80 to 100% of methyl methacrylate, 0 to 20% of a copolymerizable monoethylenically unsaturated monomer, and 0 to 2% of a copolymerizable polyfunctional monomer having at least two ethylenically unsaturated bonds.

The methyl methacrylate composite polymer (II) is either a two- or three-stage polymer prepared by the sequential two- or three-stage emulsion polymerization procedure.

10 Claims, No Drawings

VINYL CHLORIDE POLYMER COMPOSITION

The present invention relates to a vinyl chloride polymer composition having improved processing properties.

Polyvinyl chloride and a copolymer predominantly comprised of vinyl chloride are superior in many phycical and chemical properties and hence widely used for the production of various shaped articles. However, polyvinyl chloride and vinyl chloride copolymers are inferior in processing properties. That is, these polymers must be processed at a temperature within an extremely limited range and close to the thermal decomposition temperature, due to the fact that melts of these polymers possess a high viscosity and are poor in fluidity and liable to be thermally decomposed. Further, it takes a relatively long period of time to reach a gel state when processed, and it is difficult to obtain a uniform melt from finely divided solid particles within a short period of time when kneaded by rollers. The shaped articles made therefrom are poor in surface smoothness.

By the term "processing" used herein is meant a process to which polymers are subjected in the course of being shaped into articles by a procedure such as, for example, melt extrusion, calendering and injection molding, and by the term "thermoforming" is meant a process or treatment to which a shaped article such as film or sheet is subjected in the course of being formed into finished articles by a procedure such as, for example, vacuum forming and thermoforming.

The incorporation of a plasticizer therein, in order to overcome the above-mentioned defects, is widely known and practiced. However, the incorporation of a plasticizer causes some problems such as undesirable volatilization or exhalation of the plasticizer and reduction of mechanical properties of the shaped article.

On the other hand, it has been proposed to blend with a vinyl chloride polymer, a copolymer compatible with the vinyl chloride polymer, for example, a copolymer of methyl methacrylate and styrene and a copolymer of styrene and acrylonitrile, in order to improve the processing properties, and particularly, to provide a shaped article with a good smooth surface, to shorten the gelation time and to maintain a surface luster over a relatively long period of processing, or to provide a shaped article deeply drawn. However, this proposal also causes some serious problems. For example, the blending of a copolymer of methyl methacrylate and styrene contributes, only to a minor degree, to a reduction in the melt viscosity of the resulting vinyl chloride polymer composition and to an improvement of the surface luster of the resulting shaped article. The blending of a copolymer from styrene and acrylonitrile results in a polyvinyl chloride composition with a reduced thermal stability and does not contribute to the improvement of its processing properties such as shortening of the gelation time or enhancement of the thermoformability.

In general, the blending of a copolymer predominantly comprised of methyl methacrylate shortens the gelation time and enhances the elongation at break at a high temperature and therefore, enables the production of deeply drawn shaped articles, and is well suited for a vacuum forming or for a profile extrusion. However, the blending of a methyl methacrylate copolymer tends to produce a shaped article such as film, having undesirable unfused polymer particles, so called "fish-eyes." Such extruded films are inferior in their surface luster. Further the blend of the methyl methacrylate copolymer and a vinyl chloride polymer is liable to stick to the metal surface of rollers and results in a shaped article with a deteriorated surface, due to the fact that the methyl methacrylate copolymer possesses a high tendency of sticking to the metal surface. A disadvantage is also found in the fact that the blend exhibits an enhanced resistance to kneading because the methyl methacrylate copolymer possesses a high melt viscosity as well as the tendency of sticking to the metal surface.

To incorporate a lubricant therein in order ot overcome the above-mentioned defects has also been proposed. However, the incorporation of a lubricant has a bad influence on the physical properties of shaped articles made therefrom, and produces a lubricating effect with only short durability.

Therefore, it is one of the main objects of the present invention to provide a vinyl chloride polymer composition having improved processing properties such as an improved thermal stability, shortened gelation time and an improved thermoformability, and having a durable lubricating property, and accordingly, resulting in shaped articles having a considerably reduced number of unfused polymer particles, even when the polymer composition is a plasticized polymer composition, and being superior in its transparency and surface luster.

Other objects and advantages will be apparent from the following description.

In accordance with the present invention, a thermoplastic vinyl chloride polymer composition is provided which comprises I. 80 to 99.9 parts by weight of polyvinyl chloride and/or a copolymer containing no less than 80% by weight of vinyl chloride and no greater than 20% by weight of at least one other copolymerizable ethylenically unsaturated monomer, and II. 20 to 0.1 parts by weight of a methyl methacrylate composite polymer characterized by the combination of 10 to 60% by weight of component a consisting essentially of, in polymerized form, 80 to 100% by weight of methyl methacrylate, 0 to 20% by weight of at least one copolymerizable monoethylenically unsaturated monomer, and 0 to 2% by weight of at least one copolymerizable polyfunctional monomer having at least two ethylenically unsaturated bonds, and having a reduced viscosity $\eta sp/C$ of at least 2.0;

40 to 80% by weight of component B consisting essentially of in polymerized form, 30 to 80% by weight of styrene or substituted styrene and 70 to 20% by weight of an acrylic acid ester or a methacrylic acid ester, the component B being prepared by polymerizing monomers thereof in the presence of a preformed latex of the component A and having a reduced viscosity $\eta sp/C$ of not greater than 1.0; and, 0 to 40% by weight of component C consisting essentially of in polymerized form, 80 to 100% by weight of methyl methacrylate, 0 to 20% by weight of at least one copolymerizable monethylenically unsaturated monomer, and 0 to 2% by weight of at least one copolymerizable polyfunctional monomer having at least two ethylenically unsaturated bonds, the components C being prepared by polymerizing monomers thereof in the presence of a preformed latex of the component B.

The methyl methacrylate composite polymer (II) is either a two-stage polymer prepared by the sequential two-stage emulsion polymerization procedure wherein a monomer charge of component B is polymerized in the presence of or onto a preformed latex prepared by the polymerization of a monomer charge of component A, or a three-stage polymer prepared by the sequential three-stage emulsion polymerization procedure wherein a monomer charge of component C is polymerized in the presence of or into a preformed latex of the two-stage polymer mentioned above.

Component (I) to be blended with the methyl methacrylate composite polyer (II) is polyvinyl chloride or a copolymer of no less than 80% by weight of vinyl chloride and no greater than 20% by weight of at least one other copolymerizable ethylenically unsaturated monomer. The copolymerizable ethylenically unsaturated monomer includes those which are well-known as a comonomer used for the production of vinyl chloride compolymers having uses for shaped articles, for example, olefins such as ethylene and propylene, vinyl esters such as vinyl acetate, and esters of acrylic acid and methacrylic acid such as methyl methacrylate and methyl acrylate. Polyvinyl chloride and the vinyl chloride copolymers may be used along or in combination with each other. This component (I) is hereinafter referred to as "vinyl chloride polymer" for brevity.

The methyl methacrylate composite polymer (II) of the invention, which is a two- or three-stage polymer as mentioned herein before, will now be described in detail.

Component A, which is the core constituent of the methyl methacrylate composite polymer (II), consists essentially, in polymerized form, of 80 to 100% by weight of methyl methacrylate, 0 to 20% by weight of a copolymerizable monethylenically unsaturated monomer and 0 to 2% by weight of a copolymerizable polyfunctional monomer having at least two ethylenically unsaturated bonds. Such monoethylenically unsaturated monomers include, for example, aromatic vinyl compounds such as styrene; unsaturated nitriles such as acrylonitrile and methacrylonitrile; vinyl esters such as vinyl acetate; methacrylic acid esters other than methyl methacrylate such as n-butyl methacrylate and 2-ethylhexyl methacrylate; and acrylic acid esters such as ethyl acrylate, 2-ethylhexy acrylate and n-butyl acrylate. All these monoethylenically unsaturated monomers may be used along or in combination.

Component A may contain, in polymerized form, a minor amount of a polyfunctional monomer having at least two ethylenically unsaturated bonds in the molecule. The incorporation of a minor amount of the polyfunctional monomer in component A far improves the thermoformability of the resulting vinyl chloride polymer composition. The amount of the polyfunctional monomer should preferably be no greater than 2% by weight, more preferably 0.05 to 1.0% by weight, based on the weight of component A.

Such polyfunctional monomers include, for example, ethylene glycol dimethacrylate, ethylene glycol diacrylate, diethylene glycol dimethacrylate, diethlene glycol diacrylate, triethylene glycol dimethacrylate, triethylene glycol diacrylate, tetraethlene glycol dimethacrylate, tetraethylene glycol diacrylate, divinylbenzene and triallyl cyanurate. These may also be used along or in combination.

The amount of component A is 10 to 60% by weight based on the weight of the composite polymer (II). In the case of a two-stage composite polymer, the amount of component A is preferably 20 to 60% by weight and more preferably 40 to 50% by weight. In the case of a three-stage composite polymer, it is preferably 10 to 45% by weight and more preferably 20 to 40% by weight. When the amount of component A exceeds the upper limit, i.e. 60% by weight, the vinyl chloride polymer composition becomes poor in lubricating efficiency. In contrast, when the amount of component A is less than the lower limit, i.e. 10% by weight, the vinyl chloride polymer composition is extremely poor in thermoforming properties, and poor in durability of the lubrication.

Component A should have a relatively high molecular weight for the benefits of good thermoforming property and improved lubrication durability. In general, the reduced viscosity $\eta sp/C$ is 2.0 to 15, as measured in chloroform at a temperature of 25°C and a concentration of 0.10 g/100 ml.

Component B in the two- or three-stage methyl methacrylate composite polymer (II) consists essentially, in polymerized form, of styrene or substituted styrene and acrylic acid ester or methacrylic acid ester. The amount of styrene is 30 to 80% by weight and preferably 50 to 70% by weight, and the amount of acrylic acid ester or methacrylic acid ester is 70 to 20% by weight and preferably 50 to 30% by weight. When the amount of styrene in component B exceeds 80% by weight, i.e., the amount of acrylic or methacrylic acid ester is below 20% by weight, the vinyl chloride polymer composition is poor in transparency as well as lubricating efficiency. In contrast, when the amount of styrene is below 30% by weight, i.e., the amount of acrylic or methacrylic acid is larger than 70% by weight, the vinyl chloride polymer composition has the following defects. That is, the gelation time, which is expressed by the period of time required for the kneading resistance to reach maximum when the polymer composition is kneaded at a stated high temperature, becomes extremely lond and, therefore, the polymer composition becomes poor in release from the surface of metal mill roler and rate of extrusion.

Acrylic acid esters and methacrylic acid esters in component B include, for example, alkyl acrylates and alkyl methacrylates, the alkyl group having 1 to 12 carbon atoms, such as methyl acrylate, methyl methacrylate, ethyl acrylate, ethyl methacrylate, n-butyl acrylate, n-butyl metharylate, isobutyl acrylate, 2-ethylhexyl acrylate and 2-ethylhexyl methacrylate; and substituted alkyl acrylates and substituted alkyl methacrylates, the substituted alkyl group having 1 to 12 carbon atoms, such as chloroethyl acrylate and chloroethyl methacryrlate. These acrylic and methacrylic acid esters may be used along or in combination. Of these monomers which are capable of producing a polymer of a low glass transition temperature, such as n-butyl acrylate, 2-ethylhexyl acrylate and ethyl acrylate are preferable.

Substituted styrenes in component B include, for example, α-methyl styrene, chlorostyrene and α-hydroxy methyl styrene.

The amount of component B is 40 to 80% by weight, preferably 50 to 60% by weight, based on the weight of the composite polymer (II). When the amount of component B is less than 40% by weight, the polymer composition is poor in lubricating efficiency. In contrast, when the amount exceeds 80% by weight, the polymer composition becomes inferior in thermoformability as well as lubricating efficiency.

Component B should preferably have a molecular weight as low as possible in order to have a good lubricating efficiency. In general the reduced viscosity $\eta sp/C$ of component B is not greater than 1.0, preferably within the range of 0.2 to 0.8.

In the preparation of component B, styrene or substituted styrene and acrylic or methacrylic acid ester should be added as a mixture to the polymer latex of component A so that the monomers may be copolymerized with a random form. It should be avoided that styrene is graftcopolymerized onto a polymer of acrylic or methacrylic acid ester, or acrylic or methacrylic acid ester is graftcopolymerized onto a polymer of styrene. If any monomer component is present with a block copolymer in the composite polymer, the resulting vinyl chloride polymer becomes translucent.

Component C in the three-stage methyl methacrylate composite polymer (II) consists essentially, in polymerized form, of 80 to 100% by weight of methyl methacrylate, and 0 to 20% by weight of a copolymerizable monoethylenically unsaturated monomer, and 0 to 2% by weight of a copolymerizable polyfunctional monomer having at least two ethylenically unsaturated bonds. Such monoethylenically and polyfunctional unsaturated monomers include, for example, those hereinbefore mentioned with respect to component A. These may also be used along or in combination. It is preferable that component C is composed of only methyl methacrylate becausee the resulting vinyl chloride polymer composition has a far enhanced thermoforming property.

The amount of component C is not more than 40% by weight based on the weight of the methyl methacrylate composite polymer (II). The component C may be omitted. However, in the case where the polymer compositions excellent in handleness of the powdered polymer composition and other processing properties are desired, the component C should preferably be present at least 5% by weight. Optimum results are obtainable when the amount of the component C is within the range of 10 to 30% by weight, based on the weight of the composite polymer (II).

The methyl methacrylate composite polymer (II) is prepared by a sequential two- or three-stage emulsion polymerization procedure. The emulsion polymerization may be preformed by using known emulsifiers and known polymerization initiators including those soluble either in oil or in water. A redox catalyst may be employed. The polymerization degree can be controlled in a known manner, for example, by adding a chain transfer agent or varying the polymerization temperature. The emulsifiers are added only in the first stage polymerization, but not added in the succeeding second and third stage polymerizations so as to substantially avoid the formation of a polymer composed of only component B and a polymer composed of only C.

In general, the component C preferably has a reduced viscosity $\eta sp/C$ of at least 0.3.

The two-stage methyl methacrylate composite polymer has a structure such that the polymer of component B having a relatively low molecular weight covers the methyl methacrylate polymer particle of component A having a relatively high molecular weight in the state that component B is uniformly dispersed on the particle of component A or partially grafted onto component B. Thus, the two-stage composite polymer produces an enhanced lubrication durability.

When a polymer of a single component A or B is incorporated into vinyl chloride polymer, satisfactory lubricating efficiency is not obtainable. Also, when a composite polymer prepared by polymerizing a monomer charge of component A in the presence of a preformed polymer latex of component B, i.e. by a reverse sequential two-stage polymerization procedure, is incorporated into vinyl chloride polymer, the desired results are not obtainable. That is, mill roller release lubrication duribality and the elongation at a high temperature are reduced, and the gelation time become small, leading to the reduction of thermoformability.

Further, when a polymer latex of single component A and a polymer latex of single component B are blended with each other, and then coagulated with salt, the vinyl chloride polymer composition having the blend incorporated therein is superior in lubricating efficiency to the comparative polymer compositions mentioned above, but inferior to the polymer composition of the invention as shown in Table I, in Example 1. Moreover, the above vinyl chloride polymer composition is disadvantageous from the point of view that it is troublesome and laborious, firstly, to separately prepare and then blend the two polymer latexes and, secondly, to pulverize the resulting polymer particle. This pulverization cannot be omitted because the polymer particle is coarse due to the fact that the polymer of component B has an apparent glass transition temperature lower than room temperature.

The two-stage methyl methacrylate composite polymer is advantageous from the point of view that is results in a vinyl chloride polymer composition having good precessing properties including lubricating efficiency, as mentioned above. However, the three-stage methyl methacrylate composite polymer has been found to be more advantageous than the two-stage composite polymer with regard to the following points. The three-stage polymer results in a vinyl chloride polymer composition which is superior in handleness of the powdered polymer composition, lubrication durability and mill roller release, and is excellent in various thermoforming properties, for example, exhibits enhanced gelation speed, resistance to the drawn-down and elongation at a high temperature. This is because the three-stage composite polymer possesses a structure such that a core component A composed of a methyl methacrylate polymer having a relatively high molecular weight, which component is characterized as being rigid and poor in fluidity, is closely covered with component B characterized as having improved lubricating efficiency, and the component B is closely covered with a methyl methacrylate polymer component C characterized as having improved compatibility with a vinyl chloride polymer.

Such closely adhered three laminate structure is important for the desired result. In the case where either each of components A, B and C or a one-stage polymer composed of components A, B and C is blended with vinyl chloride polymer, the blend is not satisfactory. Also in the case where a two-stage composite polymer having a structure such that a core of component B is closely covered by component A or C is blended with vinyl chloride polymer, the blend is inferior in mill roller release, lubrication durability, gelation speed and elongation at a high temperature.

Coagulated polymer particles recovered from a latex prepared by the two- or three-stage emulsion polymerization procedure generally contain a considerable amount of very fine particles, e.g., having a size of less than approximately 1 micron. This is due to the fact that a methyl methacrylate polymer possesses a high glass transition temperature. Such coagulated polymer particles are not advantageous from the point of view that they are poor in workability, particularly handleness of the powdered polymer composition.

If a polymer has a glass transition temperature lower than room temperature, it is difficult to obtain a coagulated polymer in the form of particles from the latex by coagulation. However, the methyl methacrylate composite polymer of the invention possess a suitable glass transition temperature. Particularly, the three-stage composite polymer is advantageous because it has a methyl methacrylate polymer outer layer of a high glass transition temperature and hence, the coagulation procedure can be performed stably and continuously.

It is preferable to add a minor amount of an anionic surface active agent to the polymer latex prior to, simultaneously with or after the addition of a coagulating agent for recovery. This treatment magnifies the size of polymer particles to be recovered from the coagulated latex. In general, coagulated polymer particles so treated have a magnified size such that at least 95% by weight of the polymer particles fall within the range of 20 to 300 microns. Such coagulated polymer particles result in a vinyl chloride polymer composition excellent in not only workability, but also lubrication durability, and exhibit a moderate torque on extrusion.

It is assumed that an anionic surface active agent is adsorbed onto the surface of polymer latex particles, and the anionic surface active agent adsorbed is readily neutralized during collisions between the polymer latex particles repeatedly occurring when an acidic coagulating agent is added, and consequently brings about the flocculation between the polymer latex particles. Thus, coagulated polymer particles of a size below 1 micron can be readily magnified into a magnitude of larger than 20 microns. The neutralized anionic surface active agent present on the polymer particle functions as a lubricant in the vinyl chloride polymer composition.

The anionic surface active agent is not limited to a special anionic surface active agent but may be selected from known anionic surface active agents. It includes, for example, sodium salt of fatty acids, sodium alkylbenzenesulfonate, potassium salt of fatty acids, sodium alkylsulfonate, sodium rosinate, phenylpolyethoxyalkyl sulfate salts, sodium dialkylsulfosuccinate, alkyl phosphate salts, and a condensation product of sodium naphthalenesulfonate and formaldehyde. These may be used along or in combination.

The amount of the anionic surface active agent is usually 0.1 to 5.0% by weight based on the weight of the methyl methacrylate composite polymer. When the amount exceeds the upper limit, the resulting vinyl chloride polymer composition loses its transparency.

The anionic surface active agent may be added to the polymer latex usually either prior to or simultaneously with the addition of a coagulating agent to the polymer latex. However, it is also possible to add the anionic surface active agent after a coagulating agent is added.

Suitable coagulating agents are determined depending upon the particular anionic surface active agent employed. Preferably, a coagulating agent is either acid along or a combination of acid and salt.

In the practice of the present invention, at least 0.1% by weight, based on the weight of the vinyl chloride composition, of the methyl methacrylate composite polymer (II) should be present in the resulting composition in order that at least some benefit of the present invention may be obtained. The incorporation of a large amount, i.e. exceeding 20%, of the methyl methacrylate composite polymer (II) results in the composition possessing inferior surface characteristics. It is therefore preferred that the methyl methacrylate composite polymer (II) is present in the vinyl chloride polymer composition in an amount of 0.1 to 20% by weight.

Apparently the particular manner whereby the methyl mwthacrylate composite polumer (II) is incorporated into the vinyl chloride polymer (I), is not critical. The methyl methacrylate composite polymer (II) can, for example, be simply physically blended in a dry state with the vinyl chloride polymer (I) by a conventional mixer such as a Henschel mixer. Further, smaller amounts of additives such as stablizers, colorants, plasticizers, fillers, lubricants, impact modifiers and the like may be incorporated into the composition of the present invention, if desired.

The invention will be further illustrated by the Examples, in which all parts and percentages are by weight unless otherwise specified.

The following abbreviations are employed in Tables give below:
MMA: Methyl methacrylate
EA: Ethyl acrylate
BMA: Butyl methacrylate
BuA: Butyl acrylate
2EHMA: 2-Ethylhexyl methacrylate
2EHA: 2-Ethylhexyl acrylate
MA: Methyl acrylate
AN: Acrylonitrile
ST: Styrene
EDMA: Ethyleneglycol dimethacrylate
TAC: Triallyl cyanurate
DEDMA: Diethylenegylcol dimethacrylate
TEDMA: Triethylenegylcol dimethacrylate
EDA: Ethylene glycol diacrylate Characteristics of vinyl chloride polymer compositions were determined as follows.

1. Mill roller release 200 g of the polymer composition specimen was milled by a pair of rollers each having a diameter of six inches and disposed with a 2 mm interval therebetween, one being maintained at 200°C and the other being 195°C. After the lapse of a stated period of time, the milled specimen was peeled-off from the roller maintained at 200°C. The polymer composition specimen was graded grades 1 through 5, dependent upon the difficulty or ease of peeling it off. Grades 1 and 5 meant that it was difficult and easy, respectively to peel-off the specimen from the roller. Therefore the larger the grade number, the better mill roller release the polymer composition had.

2. Extrusion rate

The extrusion rate in gram per minute was measured when the polymer composition was extruded into a sheet of 0.2 mm in thickness by an extruder having an inner diameter of 25 mm and provided with a T-die. The temperature of the T-die was 1980°C.

3. Elongation at high temperature

The sheet specimens prepared as set forth in the preceding item (2) were laminated and pressed at a temperature of 185°C into a plate of 1 mm in thickness, and cut into the shape of dumbell. Elongation at break of the plate specimen was determined by using tensilon at a temperature of 150°C and the rate of grip separation of 50 mm per minute.

4. Gelation time

The polymer composition was kneaded by using a Brabender plasti-corder under the following conditions: temperature of kneading, 190°C; number of revolution, 30 rpm; amount of polymer charged, 60 g, and; time period of preheating, 5 minutes. Gelation time was expressed by the time period in minutes until the kneading resistance reached maximum. The maximum kneading resistance is hereinafter referred to as "maximum torque." As the gelation time became shorter it became easier to process the polymer composition.

5. Haze

The sheet specimen prepared as set forth in item (2) were laminated and pressed at a temperature of 185°C into a plate of 2 mm in thickness. Haze in % was determined in accordance with Japanese Industrial Standard K-6714. The smaller the haze value, the greater the transparency of the specimen.

6. Powder cohesion

The cohesion of the finely divided polymer composition specimen was determined by placing the specimen over a period of 60 minutes in a gear oven maintained at stated temperatures. The specimen is graded into three grades i.e.,⊙,○, and X, which indications mean that the specimen has little or no cohesiveness; moderate cohesiveness; and high cohesiveness, respectively. The higher the cohesion, the more difficult it was to handle and process the polymer composition because finely divided powder of the polymer composition undesirably cohered with each other in the course of processing.

Reduced viscosity $\eta sp/C$ of each component of the methyl methacrylate composite polymer was determined at 25°C in a solution in chloroform at a concentration of 0.1 g of the polymer per 100 ml. However, reduced viscosities sp/C of components B and C were determined as follows. A monomer charge of each of components B and C was along polymerized or copolymerized, and graphs were drawn showing the dependence of the reduced viscosity ($\eta sp/C$ of the resulting polymers or copolymers upon the amount of a chain transfer agent employed. Reduced viscosities of components B and C in the composite polymer could be seen from the graphs to be dependent upon the amount of chain transfer agent employed in the step of preparation of component B or B in the course of preparation of the composite polymer.

EXAMPLE 1

A polymerization reactor equipped with a stirrer and a reflux condenser was charged with 250 parts of distilled water, 1.5 parts of dioctyl sodium sulfosuccinate, 0.2 part of ammonium persulfate, 50 parts of methyl methacrylate, and 0.015 part of n-octyl mercaptan, and flashed with nitrogen. Under the nitrogen atmosphere, the mixture was heated to a temperature of 65°C while being stirred, and the stirring was continued at this temperature for 3 hours to substantially complete the reaction.

To the polymer latex so obtained, a mixture of 30 parts of styrene, 20 parts of n-butyl acrylate and 1.5 parts of n-octyl mercaptan was gradually added while still maintaining the temperature at 65°C over a period of 1 hour, followed by the stirring for 5 hours at the same temperature. At the end of this period, the polymer was coagulated by adding thereto aluminum chloride, filtered off, washed with water and dried. The methyl methacrylate composite polymer so obtained is designated as sample (1).

Following a procedure similar to that in the first stage polymerization mentioned above, polymethyl methacrylate, designated as control sample (C3), was prepared from a monomer charge composed of 250 parts of distilled water, 1.5 parts of dioctyl sodium sulfosuccinate, 0.2 part of ammonium persulfate, 100 parts of methyl methacrylate and 0.03 part of n-octyl mercaptan.

Similarly, control sample (C4) was prepared from a monomer charge composed of 250 parts of distilled water, 1.5 parts of dioctyl sodium sulfosuccinate, 0.2 part of ammonium persulfate, 60 parts of styrene, 40 parts of n-butyl acrylate and 3.0 parts of n-octyl mercaptan. 50 parts of control polymer sample (C3) mentioned above and 50 parts of control polymer sampel (C4) mentioned above, both in the form of latex, were mixed and coagulated, filtered off, washed and then dried, to prepare control sample (C1).

Following a procedure similar to that in the first and second stage polymerizations mentioned above, control polymer sample ($C_2$) was prepared wherein a monomer charge of 250 parts of distilled water, 1.5 parts of dioctyl sodium sulfosuccinate, 0.2 part of ammonium persulfate, 30 parts of styrene, 20 parts of n-butyl acrylate and 1.5 parts of n-octyl mercaptan was maintained at a temperature of 65°C for 5 hours to effect the first stage polymerization, and then a monomer charge of 50 parts of methyl methacrylate and 0.015 part of n-octyl mercaptan was added over a period of one hour to the polymer latex so obtained, followed by maintaining the reaction mixture at that temperature for 3 hours to effect the second stage polymerization.

Following a procedure similar to that in the first stage polymerization mentioned in the first paragraph of this example, control polymer sampel (C5) was prepared wherein a monomer charge composed of 250 parts of distilled water, 1.5 parts of dioctyl sodium sulfosuccinate, 0.2 part of ammonium persulfate, 50 parts of methyl methacrylate, 30 parts of styrene, 20 parts of n-butyl acrylate and 1.0 part of n-octyl mercaptan was maintained at a temperature of 65°C for 5 hours.

3 parts of each sample, 100 parts of polyvinyl chloride (having an average degree of polymerization of 715), 2.0 parts of dibutyltin maleate, 1.8 parts of epoxy resin plasticizer and 0.4 part of a lubricant were blended in a Henschel mixer and the blending was continued until the temperature of the blend polymer reached 120°C.

Processing performances of the polyvinyl chloride compositions were tested. The results are shown in Table I.

Table I

| Sample No. | Composition of composite polymer | | | | Mill roller release (min) | | | | Extrusion rate (g/min) | Elongation at high temperature (%) | Gelation time (min) |
| --- | --- | --- | --- | --- | --- | --- | --- | --- | --- | --- | --- |
| | Component A | | Component B | | 5 | 10 | 15 | 20 | | | |
| | MMA (%) | ηsp/C | St/BuA (%) *4 | ηsp/C | | | | | | | |
| Invention 1 | 50 | 3.0 | *1 ← 30/20 | 0.6 | 4.0 | 4.0 | 4.0 | 4.0 | 50.2 | 210 | 1.2 |
| Control C1 | 50 | 3.0 | + 30/20 | 0.6 | 4.0 | 3.8 | 3.6 | 3.4 | 33.1 | 181 | 1.8 |
| C2 | 50 | 3.0 | → 30/20 | 0.6 | 3.8 | 3.5 | 3.3 | 3.3 | 27.8 | 179 | 2.0 |
| C3 | 100 | 3.0 | 0 | — | 3.0 | 3.0 | 2.8 | 2.5 | 28.0 | 230 | 0.8 |
| C4 | 0 | — | 60/40 | 0.6 | 3.1 | 3.0 | 2.8 | 2.6 | 26.2 | 165 | 4.8 |
| Control C5 | MMA/St/BuA = 50/30/20 ηsp/C = 1.8 | | | 3 | 3.0 | 3.0 | 2.7 | 2.4 | 21.9 | 180 | 2.6 |
| Control C6 | Blank *2 | | | | 3.0 | 2.8 | 2.5 | 2.3 | 21.3 | 150 | — |

Note

*1 ← : The monomer of component A was polymerized in the first stage, and then the monomer of component B was added thereto to effect the second stage polymerization.

→ : The monomer of component B was polymerized in the first stage, and then the monomer of component A was added thereto to effect the second stage polymerization.

+: Components A and B were mixed with each other, both in the form of latex.

*2 Control sample (C6) was composed of polyvinyl chloride, but contained no methyl methacrylate composite polymer.

As seen from the results shown in Table I, polyvinyl chloride compositions containing only either component A or component B (control samples C3 and C4), and containing a methyl methacrylate copolymer prepared by polymerizing monomers of components A and B in single stage (control sample C5) are far inferior to that of the invention, with respect to mill roller release.

Further, as seen from Table I the compositions prepared by the reverse two stage polymerization procedure (control sample C2) and by mixing components A and B (Control sample C2) are poor in mill roller release, particularly after milling for a relatively long period of time, and extrusion rate, elongation at a high temperature and gelation time, although these compositions have a separability from the roller better than those of control samples C3, C4 and C5 referred to above.

EXAMPLE 2

Following a procedure similar to that in the preparation of sample (1) in Example 1, methyl methacrylate polymer samples (2) and (3) and control samples (C7) and (C8) were prepared wherein the amount of n-octyl mercaptan used in the first stage polymerization was varied, i.e., 0.005 part for sample (2), 0.025 part for sample (3), 0.05 part for control sample (C7) and 0.25 part for control sample (C8), with all other conditions remaining substantially the same. Reduced viscosities ηsp/C of component A of samples (2) and (3) and control samples (C7) and (C8) were 5.0, 2.0, 1.0 and 0.5, respectively.

Similarly, methyl methacrylate polymer samples (4) and (5) and control samples (C9) and (C10) were prepared wherein the amount of n-octyl mercaptan used in the second stage polymerization was varied, i.e., 1.9 parts for sample (4), 0.5 part for sample (5), 0.25 part for control sample (C9) and 0.05 part for control sample (C10), with all other conditions remaining substantially the same as those in the preparation of sample (1) in Example 1. Reduced viscosities ηsp/C of component B of samples (4) and (5) and control samples (C9) and (C10) were 0.4, 1.0, 1.5 and 2.5, respectively.

Using each sample or control sample, vinyl chloride polymer compositions were prepared and tested for their processing performances in a manner as described in Example 1.

The results are shown in Table II below.

Table II

| Sample No. | Composition of composite polymer | | | | Mill roller release (min) | | | | Extrusion rate (g/min) | Elongation at high temperature (%) |
| --- | --- | --- | --- | --- | --- | --- | --- | --- | --- | --- |
| | Component A | | Component B | | 5 | 10 | 15 | 20 | | |
| | MMA (%) | ηsp/C | St/BuA (%) | ηsp/C | | | | | | |
| Invention 2 | 50 | 5.0 | 30/20 | 0.6 | 4.0 | 4.0 | 4.0 | 4.0 | 51.4 | 216 |
| 3 | 50 | 2.0 | 30/20 | 0.6 | 4.0 | 4.0 | 4.0 | 3.9 | 49.8 | 206 |
| Control C7 | 50 | 1.0 | 30/20 | 0.6 | 3.9 | 3.9 | 3.8 | 3.5 | 35.2 | 188 |
| C8 | 50 | 0.5 | 30/20 | 0.6 | 3.5 | 3.5 | 3.3 | 3.3 | 30.4 | 176 |
| Invention 4 | 50 | 3.0 | 30/20 | 0.4 | 4.0 | 4.0 | 4.0 | 4.0 | 52.8 | 211 |
| 5 | 50 | 3.0 | 30/20 | 1.0 | 3.9 | 3.9 | 3.9 | 3.9 | 48.6 | 206 |
| Control C9 | 50 | 3.0 | 30/20 | 1.5 | 3.5 | 3.3 | 3.2 | 3.1 | 32.4 | 202 |
| C10 | 50 | 3.0 | 30/20 | 2.5 | 3.3 | 3.3 | 3.2 | 3.0 | 29.8 | 207 |

As seen from the results shown in Table II, when the reduced viscosity ηsp/C of component A in the methyl methacrylate composite polymer is below 2.0 (control samples (C7) and (C8)), the vinyl chloride polymer composition is inferior in mill roller release and extrusion rate. When the reduced viscosity ηsp/C of component B in the methyl methacrylate composite polymer exceeds 1.0 (control samples (C9) and (C10)), the vinyl chloride polymer composition is far inferior in mill roller release and extrusion rate.

EXAMPLE 3

A polymerization reactor similar to that employed in Example 1 was charged with 250 parts of distilled water, 1.5 parts of dioctyl sodium sulfosuccinate, 0.2 part of ammonium persulfate, 25 parts of methyl methacrylate, and 0.003 part of n-octyl mercaptan. The mixture was stirred under an atmosphere of nitrogen at a temperature of 65°C for 3 hours to substantially complete the first stage polymerization (component A).

To the polymer latex so obtained, a mixture of 33 parts of styrene, 22 parts of n-butyl acrylate and 1.5 parts of n-octyl mercaptan was gradually added while still maintaining the reaction mixture at 65°C over a period of 1 hour, followed by stirring for 2 hours at the same temperature to substantially complete the second stage polymerization (component B).

Then, to the polymer latex so obtained, a mixture of 20 parts of methyl methacrylate and 0.006 part of n-octyl mercaptan was gradually added at 65°C over a period of 30 minutes, followed by stirring for 1.5 hours at the same temperature to substantially complete the third stage polymerization (component C). The polymer latex so obtained was coagulated by adding thereto aluminum chloride, filtered off, washed with water and dried. Thus, sample (6) was obtained.

Following a procedure similar to that mentioned above, methyl methacrylate polymer samples (7) and (8) and control samples (C11) were prepared wherein the amounts of methyl methacrylate used in the first and third stage polymerizations were varied as shown in Table III, with all other conditions remaining substantially the same.

Similarly, samples (9) and (10) and control samples (C12) and (C13) were prepared wherein the proportion of component B to component A was varied while maintaining both the ratio of styrene to butyl acrylate and the amount of component C constant (60/40 and 10 parts, respectively) as shown in Table III, with all other conditions remaining substantially the same.

Using each sample or control sample, vinyl chloride polymer compositions were prepared and tested for their processing performances in a manner as described in Example 1.

The results are shown in Table III below.

Table III

| Sample No. | Composition of composite polymer | | | | | | | Mill roller release | | | | Gelation time (min) |
|---|---|---|---|---|---|---|---|---|---|---|---|---|
| | Component A | | Component B | | | Component C | | 5 | 10 | 15 | 20 | |
| | MMA (%) | ηsp/C | St (%) | BuA (%) | ηsp/C | MMA (%) | ηsp/C | (min) | | | | |
| Control C11 | 5 | 3.0 | 33 | 22 | 0.6 | 40 | 3.0 | 3.8 | 3.6 | 3.5 | 3.4 | 0.9 |
| Invention 6 | 25 | 3.0 | 33 | 22 | 0.6 | 20 | 3.0 | 3.9 | 3.9 | 3.9 | 3.9 | 0.9 |
| 7 | 35 | 3.0 | 33 | 22 | 0.6 | 10 | 3.0 | 4.1 | 4.1 | 4.1 | 4.1 | 0.9 |
| 8 | 40 | 3.0 | 33 | 22 | 0.6 | 5 | 3.0 | 4.0 | 4.0 | 4.0 | 4.0 | 1.1 |
| Control C12 | 70 | 3.0 | 12 | 8 | 0.6 | 10 | 3.0 | 3.3 | 3.2 | 3.1 | 3.0 | 0.8 |
| Invention 9 | 50 | 3.0 | 24 | 16 | 0.6 | 10 | 3.0 | 3.8 | 3.8 | 3.8 | 3.7 | 0.9 |
| 10 | 20 | 3.0 | 42 | 28 | 0.6 | 10 | 3.0 | 3.9 | 3.9 | 3.9 | 3.9 | 1.1 |
| Control C13 | 9 | 3.0 | 48.6 | 32.4 | 0.6 | 10 | 3.0 | 3.6 | 3.6 | 3.5 | 3.5 | 4.6 |

As seen from Table III, when the amount of methyl methacrylate of component A is below 10 parts (control sample C11), the resulting vinyl chloride polymer composition is poor in mill roller release, even when component B satisfies the requirement of the invention.

Further, as seen from Table III when the amount of component B is below 40% (control sample C12), the resulting polymer composition is far inferior in mill roller release. In contrast, when amount of component B is excessively high, the resulting polymer composition is poor in gelation time as well as mill roller release.

EXAMPLE 4

Following a procedure similar to that employed in the preparation of sample (6) in Example 3, samples (11), (12) and (13) and control examples (C14) and (C15) were prepared wherein the amounts of methyl methacrylate in components A and C were 35% and 15%, respectively, and the proportion of styrene to n-butyl acrylate was varied as shown in Table IV, with all other conditions remaining substantially the same.

Using each sample or control sample, vinyl chloride polymer compositions were prepared and tested for their processing performances in a manner as described in Example 1.

The results are shown in Table IV below.

Table IV

| Sample No. | Composition of composite polymer | | | | | | | Mill roller release | | | | Gelation time (min) |
|---|---|---|---|---|---|---|---|---|---|---|---|---|
| | Component A | | Component B | | | Component C | | 5 | 10 | 15 | 20 | |
| | MMA (%) | ηsp/C | St (%) | BuA (%) | ηsp/C | MMA (%) | ηsp/C | (min) | | | | |
| Control C14 | 35 | 3.0 | 45 | 5 | 0.6 | 15 | 3.0 | 3.6 | 3.4 | 3.2 | 3.2 | 0.9 |
| Invention 11 | 35 | 3.0 | 40 | 10 | 0.6 | 15 | 3.0 | 3.9 | 3.9 | 3.9 | 3.9 | 0.9 |
| 12 | 35 | 3.0 | 30 | 20 | 0.6 | 15 | 3.0 | 4.0 | 4.0 | 4.0 | 4.0 | 0.9 |
| 13 | 35 | 3.0 | 15 | 35 | 0.6 | 15 | 3.0 | 3.9 | 3.9 | 3.9 | 3.9 | 1.4 |
| Control C15 | 35 | 3.0 | 5 | 45 | 0.6 | 15 | 3.0 | 3.6 | 3.5 | 3.5 | 3.3 | 4.1 |

As seen from Table IV, when the amount of styrene in component B exceeds 80% (control sample C14), the resulting polymer composition is poor in mill roller release. In contrast, when the amount of styrene in component B is below 30% (control sample C15), the resulting polymer is very poor in gelation time as well as poor in mill roller release.

Using each sample, vinyl chloride polymer compositions were prepared and tested for their processing performances. The results are shown in Table VI.

Table VI

| Sample No. | Composition of composite polymer | | | | | | | | | | | | Mill roller release 5 10 15 20 (min) | | | |
|---|---|---|---|---|---|---|---|---|---|---|---|---|---|---|---|---|
| | Component A | | | | | | | Component B | | | Component C | | | | | |
| | MMA (%) | St (%) | AN (%) | BMA (%) | 2EHA (%) | BuA (%) | EDMA (%) | ηsp/C | St (%) | BuA (%) | η sp/C | MMA (%) | ηsp/C | | | | |
| Invention | | | | | | | | | | | | | | | | | |
| 20 | 30 | 5 | — | — | — | — | — | 4.0 | 30 | 20 | 0.5 | 15 | 3.0 | 4.1 | 4.1 | 4.1 | 4.1 |
| 21 | 30 | — | 5 | — | — | — | — | 4.0 | 30 | 20 | 0.5 | 15 | 3.0 | 4.1 | 4.1 | 4.1 | 4.0 |
| 22 | 30 | — | — | 5 | — | — | — | 4.0 | 30 | 20 | 0.5 | 15 | 3.0 | 4.0 | 4.0 | 4.0 | 4.0 |
| 23 | 30 | — | — | — | 5 | — | — | 4.0 | 30 | 20 | 0.5 | 15 | 3.0 | 4.1 | 4.1 | 4.1 | 4.1 |
| 24 | 30 | — | — | — | — | 5 | — | 4.0 | 30 | 20 | 0.5 | 15 | 3.0 | 4.0 | 4.0 | 4.0 | 4.0 |
| 25 | 34.95 | — | — | — | — | — | 0.05 | — | 30 | 20 | 0.5 | 15 | 3.0 | 4.0 | 4.0 | 4.0 | 4.0 |

EXAMPLE 5

Following a procedure similar to that employed in the preparation of sample (6) in Example 3, samples (14), (15), (16), (17), (18) and (19) were prepared wherein 30 parts of methyl methacrylate and 5 parts of ethyl acrylate were used for component A and 15 parts of methyl methacrylate were used for component C, and mixtures of styrene and various monomers shown in Table V were used for component B, with all other conditions remaining substantially the same.

Using each sample, vinyl chloride polymer compositions were prepared and tested for their processing performances. The results are shown in Table V.

Table V

| Sample No. | Composition of composite polymer | | | | | | | | | | | | | Mill roller release 5 10 15 20 (min) | | | |
|---|---|---|---|---|---|---|---|---|---|---|---|---|---|---|---|---|---|
| | Component A | | | Component B | | | | | | | | Component C | | | | | |
| | MMA (%) | EA (%) | ηsp/C | St (%) | 2EHA (%) | EA (%) | MMA (%) | BMA (%) | 2EHMA (%) | MMA (%) | ηsp/C | MMA (%) | ηsp/C | | | | |
| Invention | | | | | | | | | | | | | | | | | |
| 14 | 30 | 5 | 2.5 | 30 | 20 | — | — | — | — | — | 0.5 | 15 | 3.0 | 4.1 | 4.1 | 4.1 | 4.1 |
| 15 | 30 | 5 | 2.5 | 30 | — | 20 | — | — | — | — | 0.5 | 15 | 3.0 | 4.0 | 4.0 | 4.0 | 4.0 |
| 16 | 30 | 5 | 2.5 | 30 | — | — | 20 | — | — | — | 0.5 | 15 | 3.0 | 3.9 | 3.9 | 3.9 | 3.9 |
| 17 | 30 | 5 | 2.5 | 30 | — | — | — | 20 | — | — | 0.5 | 15 | 3.0 | 3.8 | 3.8 | 3.8 | 3.8 |
| 18 | 30 | 5 | 2.5 | 30 | — | — | — | — | 20 | — | 0.5 | 15 | 3.0 | 3.8 | 3.8 | 3.8 | 3.8 |
| 19 | 30 | 5 | 2.5 | 30 | — | — | — | — | — | 20 | 0.5 | 15 | 3.0 | 3.6 | 3.6 | 3.6 | 3.6 |

EXAMPLE 6

Following a procedure similar to that employed in the preparation of sample (6) in Example 3, samples (20), (21), (22), (23), (24) and (25) were prepared wherein 30 parts of stryrene and 20 parts of n-butyl acrylate were used for component B and 15 parts of methyl methacrylate were used for component C, and mixtures of methyl methacrylate and various monomers shown in Table VI were used for component A, with all other conditions remaining substantially the same.

Example 7

Following a procedure similar to that employed in the preparation of sample (6) in Example 3, samples (26), (27), (28), (29), (30) and (31) were prepared wherein 25 parts of methyl methacrylate were used for component A and 30 parts of styrene and 20 parts of butyl acrylate were used for component B and mixtures of methyl methacrylate and various monomers shown in Table VII were used for component C, with all other conditions remaining substantially the same.

Using each sample, vinyl chloride polymer compositions were prepared and tested for their processing performances. The results are shown in Table VII.

Table VII

| Sample No. | Composition of composite polymer | | | | | | | | | | | | | Mill roller release 5 10 15 20 (min) | | | |
|---|---|---|---|---|---|---|---|---|---|---|---|---|---|---|---|---|---|
| | Component A | | Component B | | | Component C | | | | | | | | | | | |
| | MMA (%) | ηsp/C | St (%) | BuA (%) | ηsp/C | MMA (%) | St (%) | AN (%) | BMA (%) | 2EHA (%) | BuA (%) | EDMA (%) | ηsp/C | | | | |
| Invention | | | | | | | | | | | | | | | | | |
| 26 | 25 | 5.0 | 30 | 20 | 0.4 | 20 | 5 | — | — | — | — | — | 2.0 | 4.1 | 4.1 | 4.1 | 4.1 |
| 27 | 25 | 5.0 | 30 | 20 | 0.4 | 20 | — | 5 | — | — | — | — | 2.0 | 4.0 | 4.0 | 4.0 | 4.0 |
| 28 | 25 | 5.0 | 30 | 20 | 0.4 | 20 | — | — | 5 | — | — | — | 2.0 | 4.0 | 4.0 | 4.0 | 4.0 |
| 29 | 25 | 5.0 | 30 | 20 | 0.4 | 20 | — | — | — | 5 | — | — | 2.0 | 4.1 | 4.1 | 4.1 | 4.1 |
| 30 | 25 | 5.0 | 30 | 20 | 0.4 | 20 | — | — | — | — | 5 | — | 2.0 | 4.2 | 4.1 | 4.1 | 4.1 |
| 31 | 25 | 5.0 | 30 | 20 | 0.4 | 24.95 | — | — | — | — | — | 0.05 | — | 4.0 | 4.0 | 4.0 | 4.0 |

EXAMPLE 8

Using a blow-forming machine having a cylinder of an inner diameter of 40 mm, a suitably blended polyvinyl chloride compositions was tested for its shapability. The tested formulation comprised 90 parts of polyvinyl chloride having an average polymerization degree of 715, 10 parts of a MBS resin ("Metablen" C-200; a registered trade mark of methyl methacrylate/-butadiene/styrene terpolymer supplied by Mitsubishi Rayon Co., Ltd.), 1.5 parts of an octyltin mercaptide stabilizer, 1.5 parts of an epoxide stabilizer, 1.0 part of butyl stearate, 0.5 part of a polyglycol ester of fatty acids and 1.0 part of sample (1) prepared in Example 1. The output of blown bottles was 31.2 kg per hour, and at the end of 8 hours operation surfaces of the blown bottle still remained clear and glossy, revealing that shapability of the blend was satisfactoryily good. The test was repeated with a suitably blended polyvinyl chloride composition which was similar to that employed in the first test except that 1.0 part of sample (1) was omitted. In the test of the control composition, the output of blown bottles was 16.6 kg, and surfaces of the blown bottle became coarse within about 1 hour operation, and marked flow marks were observed on the bottle surfaces. Thus, it can be seen that addition of an effective amount of sample (1) to a polyvinyl chloride formulation will ensure a prolonged, stable operation of a blow forming machine.

The blown bottle was tested for their percent damage as follows. The blown bottle was filled with ice water and dipped in an ice water bath for 2hours, and then, the bottle was dropped from a height of 2 m. Percent damage of the blown bottle from the polyvinyl chloride composition of the invention was the same as that of the blown bottle from the control composition.

EXAMPLE 9

A vinyl chloride polymer composition composed of 100 parts of a copolymer consisting of 90% vinyl chloride and 10% vinyl acetate and having an average polymerization degree of 800, 2.2 parts of dibutyltin maleate, 1.0 part of butyl stearate, 0.5 part of stearic acid and 3 parts of sample (1) prepared in Example 1 was tested for its mill roller release. The mill roller release was 4.1 at the end of 20 minutes milling, revealing that release of the composition was satisfactorily good.

EXAMPLE 10

A polymerization reactor similar to that used in Example 1 was charged with 250 parts of distilled water, 1.5 parts of dioctyl sodium sulfosuccinate, 0.4 part of cumene hydroperoxide, 0.3 part of formaldehyde sodium sulfoxylate, 25 parts of methyl methacrylate and 0.007 part of n-octyl mercaptan, and flashed with nitrogen. Under the nitrogen atmosphere, the mixture was heated to a temperature of 65°C while being stirred, and the stirring was continued at this temperature for 3 hours to substantially complete the first stage polymerization.

To the polymer latex so obtained, a mixture of 33 parts of styrene, 22 parts of n-butyl acrylate, 1.5 parts of n-octyl mercaptan was gradually added while still maintaining the temperature at 65°C over a period of 1 hour, followed by the stirring for 2 hours at the same temperature to substantially complete the second stage polymerization.

Further, to the polymer latex so obtained, a mixture of 20 parts of methyl methacrylate and 0.003 part of n-octyl mercaptan was gradually added while maintaining the temperature at 65°C over a period of 3 minutes, followed by the stirring for 1.5 hours at the same temperature to substantially complete the third stage polymerization.

3%, based on the weight of the polymer contained in the latex so obtained, of potassium oleate was added to the latex while being stirred. The polymer was then coagulated by adding thereto aluminum chloride and sulfuric acid, filtered off, washed with water and finally dried. The methyl methacrylate composite polymer so obtained is designated as sample (32). Distribution of particle size of sample (32) was as follows: 300 to 150 microns, 16.9%; 150 to 100 microns, 28.3%; 100 to 63 microns, 36.5%; 63 to 20 microns, 18.2% and below 20 microns, 0.1%.

Similarly, methyl methacrylate composite polymer samples (33), (34) and (35) were prepared wherein the proportion of component A to component C was varied as shown in Table VIII.

Using each sample, vinyl chloride polymer compositions were prepared and tested for their processing performances in a manner similar to that in Example 1. The results are shown in Table VIII below.

Table VIII

| | Composition of composite polymer | | | | | | | Mill roller release | | | | Gelation time (min) | Powder cohesion (Temp. °C) | | | | |
|---|---|---|---|---|---|---|---|---|---|---|---|---|---|---|---|---|---|
| Sample No. | Component A MMA (%) | ηsp/C | St (%) | Component B BuA (%) | ηsp/C | Component C MMA (%) | ηsp/C | 5 | 10 | 15 | 20 | | 60 | 70 | 80 | 90 | 100 |
| Invention | | | | | | | | | | | | | | | | | |
| 32 | 25 | 3.0 | 33 | 22 | 0.6 | 20 | 3.0 | 3.9 | 3.9 | 3.9 | 3.9 | 0.9 | ⊙ | ⊙ | ⊙ | ⊙ | ○ |
| 33 | 35 | 3.0 | 33 | 22 | 0.6 | 10 | 3.0 | 4.1 | 4.1 | 4.1 | 4.1 | 0.9 | ⊙ | ⊙ | ⊙ | ○ | ○ |
| 34 | 40 | 3.0 | 33 | 22 | 0.6 | 5 | 3.0 | 4.0 | 4.0 | 4.0 | 4.0 | 1.1 | ⊙ | ⊙ | ○ | ○ | ○ |
| 35 | 45 | 3.0 | 33 | 22 | 0.6 | — | — | 4.0 | 4.0 | 4.0 | 4.0 | 1.2 | X | X | X | X | X |

As seen from Table VIII, powder cohesion greatly varies depending upon the amount of component C in the composite polymer.

EXAMPLE 11

Following a procedure similar to that employed in the preparation of sample (32) in Example 10, methyl methacrylate three-stage composite polymer samples (36), (37), (38), (39) and (40) were prepared wherein 25 parts of methyl methacrylate was used for component A and 22 parts of methyl methacrylate was used for component C, and various amounts of sodium stearate was used instead of the potassium oleate, with all other conditions remaining substantially the same.

Using each sample, vinyl chloride polymer compositions were prepared and tested for their processing performances in a manner similar to that in Example 1. Distribution of particle size of each sample was tested. The results are shown in Table IX below.

Table IX

| Sample No. | Component A MMA (%) | ηsp/C | Component B St (%) | BuA (%) | ηsp/C | Component C MMA (%) | ηsp/C | Na stearate (%) | below 20 | 20 to 63 | 63 to 100 | 100 to 150 | 150 to 300 | Haze (%) | Maximum torque (kg·m) |
|---|---|---|---|---|---|---|---|---|---|---|---|---|---|---|---|
| Invention |||||||||||||||||
| 36 | 25 | 5.0 | 33 | 22 | 0.5 | 20 | 1.2 | 0 | 32.2 | 24.2 | 15.7 | 15.5 | 12.4 | 8.0 | 4.6 |
| 37 | 25 | 5.0 | 33 | 22 | 0.5 | 20 | 1.2 | 0.05 | 18.3 | 30.5 | 26.2 | 13.4 | 11.6 | 8.1 | 4.4 |
| 38 | 25 | 5.0 | 33 | 22 | 0.5 | 20 | 1.2 | 0.1 | 1.8 | 24.7 | 30.8 | 28.2 | 14.5 | 8.0 | 3.9 |
| 39 | 25 | 5.0 | 33 | 22 | 0.5 | 20 | 1.2 | 2 | 0.1 | 18.6 | 35.8 | 28.6 | 17.0 | 8.1 | 3.8 |
| 40 | 25 | 5.0 | 33 | 22 | 0.5 | 20 | 1.2 | 5 | 0.1 | 17.8 | 35.2 | 29.6 | 17.3 | 9.6 | 3.8 |

What is claimed is:

1. A thermoplastic vinyl chloride polymer composition which comprises
   I. 80 to 99.9 parts by weight of polyvinyl chloride and/or a copolymer containing no less than 80% by weight of vinyl chloride and no greater than 20% by weight of at least one other copolymerizable ethylenically unsaturated monomer, and
   II. 20 to 0.1 parts by weight of a methyl methacrylate composite polymer characterized by the combination of
   10 to 60% by weight of component A consisting essentially of, in polymerized form, 80 to 100% by weight of methyl methacrylate, 0 to 20% by weight of at least one copolymerizable monoethylenically unsaturated monomer and 0 to 2% by weight of at least one copolymerizable polyfunctional monomer having at least two ethylenically unsaturated bonds, and having a reduced viscosity ηsp/C of at least 2.0;
   40 to 80% by weight of component B consisting essentially of in polymerized form, 30 to 80% by weight of styrene and 70 to 20% by weight of an acrylic acid ester or a methacrylic acid ester, the component B being prepared by polymerizing monomers thereof in the presence of a preformed latex of the component A and having a reduced viscosity ηsp/C of not greater than 1.0; and,
   0 to 40% by weight of component C consisting essentially of, in polymerized form, 80 to 100% by weight of methyl methacrylate and 0 to 20% by weight of at least one copolymerizable monoethylenically unsaturated monomer and 0 to 2% by weight of at least one copolymerizable polyfunctional monomer having at least two ethlenically unsaturated bonds, the component C being prepared by polymerizing monomers thereof in the presence of a preformed latex of the component B.

2. A thermoplastic vinyl chloride polymer composition according to claim 1, wherein said methyl methacrylate composite polymer is a two-stage polymer prepared by polymerizing 40 to 80% by weight of a monomer charge of the component B in the presence of 20 to 60% by weight of the component A in the form of latex.

3. A thermoplastic vinyl chloride polymer composition according to claim 1, wherein said methyl methacrylate composite polymer is a three-stage polymer prepared by polymerizing 40 to 70% by weight of a monomer charge of the comoponent B in the presence of 10 to 45% by weight of the component A in the form of latex, and then polymerizing 5 to 40% by weight of a monomer charge of the component C in the presence of 40 to 70% by weight of the component B in the form of latex.

4. A thermoplastic vinyl chloride polymer composition according to claim 3, wherein the amount of the monomer charge of the component C is 10 to 30% by weight based on the weight of the methyl methacrylate composite polymer (II).

5. A thermoplastic vinyl chloride polymer composition according to claim 1, wherein said component A has a reduced viscosity of 2 to 15 and said component B has a reduced viscosity of 0.2 to 0.8.

6. A thermoplastic vinyl chloride polymer composition according to claim 1, wherein no greater than 5% by weight of at least one anionic surface active agent, based on the weight of the methyl methacrylate composite polymer, is added to the latex of the methyl methacrylate composite polymer prior to, simultaneously with or after the addition of a coagulating agent to the polymer latex.

7. A thermoplastic vinyl chloride polymer composition according to claim 6, wherein coagulated particles of said methyl methacrylate composite polymer treated with said anionic surface active agent have, before being dried, a size that at least 95% by weight of the particles fall within the range of 20 to 300 microns.

8. A thermoplastic vinyl chloride polymer composition according to claim 1, wherein said acrylic acid ester or said methacrylic acid ester, contained in polymerized form in component B, is at least one compound selected from alkyl acrylates and alkyl methacrylates, the alkyl group having 1 to 12 carbon atoms, and substituted alkyl acrylates and substituted alkyl methacrylates, the substituted alkyl group having 1 to 12 carbon atoms.

9. A thermoplastic vinyl chloride polymer composition according to claim 1, wherein said copolymerizable monoethylenically unsaturated monomer contained in polymerized form in components A and C is at least one compound selected from aromatic vinyl compounds, unsaturated nitriles, vinyl esters, alkyl acrylates, the alkyl group having 1 to 12 carbon atoms, and alkyl methacrylates, the alkyl group having 2 to 12 carbon atoms.

10. A thermoplastic vinyl chloride polymer composition according to claim 1, wherein said copolymerizable polyfunctional monomer having at least two ethylenically unsaturated bonds contained, in polymerized form, in the component A and C is at least one selected from ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethlene glycol dimethacrylate, divinylbenzene and triallyl cyanurate.

* * * * *